Oct. 22, 1935.  J. C. SMITH  2,017,924
AUTOMATIC APPLICATOR
Filed Oct. 19, 1933
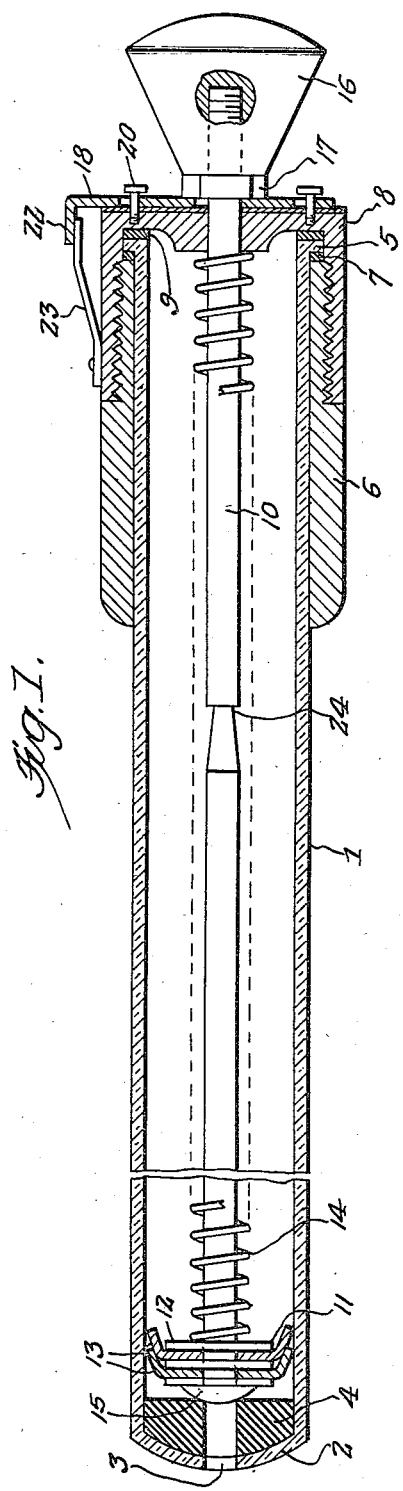
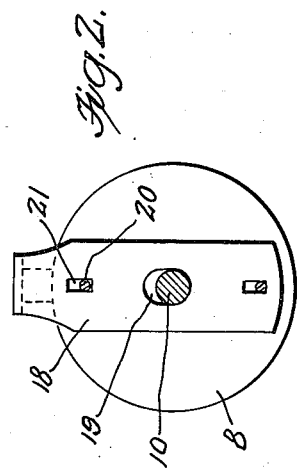
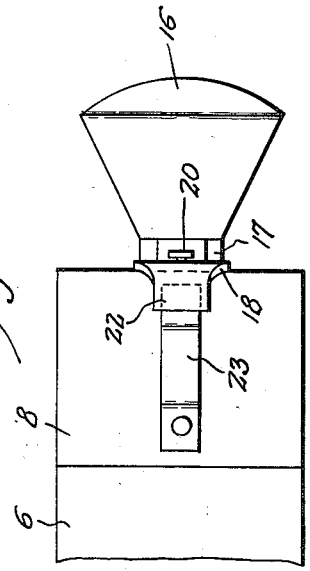
Inventor
Joseph C. Smith,
By Clarence A. O'Brien
Attorney Patented Oct. 22, 1935

2,017,924

UNITED STATES PATENT OFFICE 2,017,924

AUTOMATIC APPLICATOR

Joseph C. Smith, Kansas City, Mo.

Application October 19, 1933, Serial No. 694,335

1 Claim. (Cl. 128—234)

This invention relates to an automatic applicator for the application of medical ointments and the like to wounds and orifices, the general object of the invention being to provide means for ejecting the ointment or other material from a container into the wound or orifice by a constant pressure to effect complete and thorough application.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a longitudinal sectional view through the device.

Figure 2 is a top plan view with the rod in section and the screws in section.

Figure 3 is a fragmentary elevation looking toward the left side of Figure 1.

In this drawing, the numeral 1 indicates a tube of glass or the like which has one end rounded, as shown at 2, with a centrally arranged opening 3 in said end and a washer 4 of rubber or the like is placed in said end, and having an opening therein which registers with the opening 3. The other end of the tube is open and is formed with an outwardly extending flange 5. The tube is passed through a relatively short barrel or sleeve 6 and a gasket 7 is placed between the flange and the upper or outer end of the barrel, as shown. This barrel has its upper or outer part reduced and threaded for receiving the threaded part of a cap 8 and a gasket 9 is placed between a part of the cap and the flange 5. Thus when the cap is threaded on the barrel, the tube is held in place and the two gaskets 7 and 9 form a tight joint between the parts. A rod 10 passes through a centrally arranged hole in the cap and has a piston 11 on its inner end, said piston being formed of a plurality of metal washers 12 and the resilient washers 13. A spring 14 encircles the rod and has one end bearing against the cap and the other against the innermost washer 12 so that the spring holds the washers forming the piston against the upset end 15 of the rod, causing the metal washers to expand the rubber washers so that these rubber washers will contact the inner wall of the tube and thus prevent leakage between the rubber washers and the tube. Of course, this spring acts to hold the rod and piston in their innermost positions, as shown in Figure 1.

A handle 16 is threaded to the outer end of the rod and is held against turning movement by the lock nut 17.

A plate 18 passes across the cap and has an oblong hole 19 therein for the passage of the rod and the plate is slidably connected with the cap by means of the screws 20 carried by the cap and passing through the slots 21 in the plate. One end of the plate projects beyond the cap and this end is bent over, as shown at 22, and the bent end is engaged by a spring 23 attached to the barrel. A shoulder 24 is formed on an intermediate part of the rod 10 so that when the rod is pulled outwardly by its handle, a part of the plate will engage the shoulder to hold the rod and piston in projected position, the spring 23 automatically moving the plate to holding position. By pressing upon the bent end 22 of the plate, the plate will move inwardly and thus release itself from the shoulder so that the spring 14 will press the piston and the rod inwardly, thus discharging the contents of the tube with a pressure which remains constant.

All materials used in the device should be such as to permit boiling or sterilization without damage, and as will be seen, the parts can be readily disassembled by unscrewing the cap from the barrel.

As before stated, this device is useful in the application of ointment and the like to wounds or orifices, such as nasal, vaginal and rectal, where force is required in order to effect complete and thorough application.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

An automatic applicator comprising an elongated glass tube having one end open and said end having an outwardly extending flange thereon, the other end being closed and having a centrally arranged port, an elongated metal barrel of the same interior diameter throughout snugly receiving the upper portion of the tube, a gasket between the upper end of the barrel and the flange of the tube, the upper portion of the barrel being exteriorly reduced and exteriorly screw-threaded, a flanged cap having the lower portion of its flange interiorly screw threaded to engage the screw threads of the barrel, the exterior circumference of the flanged cap being the same as the exterior circumference of the major portion of the barrel, a gasket between the flange of the tube and the top part of the cap, a rod passing through the cap into the tube, a piston connected to the inner end of the tube, a spring connected with the rod and bearing against the piston and the cap for holding the piston in lowered position, a handle on the outer end of the rod, a shoulder on the rod intermediate the ends thereof, and a latch member carried by the cap for engaging the shoulder for holding the piston in raised position.

JOSEPH C. SMITH.